(12) United States Patent
Gordon

(10) Patent No.: US 12,116,064 B2
(45) Date of Patent: Oct. 15, 2024

(54) FRONT STRUCTURAL BULKHEAD FOR VEHICLE CHASSIS

(71) Applicant: Robby Gordon, Charlotte, NC (US)

(72) Inventor: Robby Gordon, Charlotte, NC (US)

(*) Notice: Subject to any disclaimer, the term of this patent is extended or adjusted under 35 U.S.C. 154(b) by 186 days.

(21) Appl. No.: 17/851,765

(22) Filed: Jun. 28, 2022

(65) Prior Publication Data

US 2022/0379981 A1 Dec. 1, 2022

Related U.S. Application Data

(63) Continuation-in-part of application No. 17/700,197, filed on Mar. 21, 2022.

(60) Provisional application No. 63/164,079, filed on Mar. 22, 2021.

(51) Int. Cl.
| | | |
|---|---|---|
| *B62D 63/02* | (2006.01) | |
| *B60G 3/18* | (2006.01) | |
| *B62D 21/11* | (2006.01) | |
| *B62D 25/08* | (2006.01) | |
| *B62D 27/02* | (2006.01) | |

(52) U.S. Cl.
CPC ............ *B62D 63/025* (2013.01); *B60G 3/18* (2013.01); *B62D 21/11* (2013.01); *B62D 25/08* (2013.01); *B62D 27/023* (2013.01)

(58) Field of Classification Search
CPC ...... B62D 63/025; B62D 21/11; B62D 25/08; B62D 27/023; B60G 3/18
See application file for complete search history.

(56) References Cited

U.S. PATENT DOCUMENTS

| | | | | |
|---|---|---|---|---|
| 10,232,882 B2 | * | 3/2019 | Bertezzolo | ............. B62D 21/12 |
| 10,633,021 B2 | * | 4/2020 | Gordon | ............... B60G 15/063 |
| 10,836,438 B2 | * | 11/2020 | Yamauchi | ............ B62D 25/082 |
| 2016/0257360 A1 | * | 9/2016 | MacKenzie | .......... B62D 63/025 |

FOREIGN PATENT DOCUMENTS

| | | | | | |
|---|---|---|---|---|---|
| GB | 2367270 A | * | 4/2002 | | ........... B62D 25/082 |
| KR | 20210032183 A | * | 9/2019 | | |

OTHER PUBLICATIONS

KR20210032183 A Machine English translation (Year: 2019).*

* cited by examiner

*Primary Examiner* — Jason D Shanske
*Assistant Examiner* — Matthew James O'Neill
(74) *Attorney, Agent, or Firm* — Barry Choobin; Patent 360

(57) ABSTRACT

An apparatus and methods are provided for a front structural bulkhead for improving the strength of an off-road vehicle chassis. The chassis is a welded-tube variety of chassis that includes a front portion and a rear portion that are joined to an intervening passenger cabin portion. Frontward stays and a bulkhead mount couple the front structural bulkhead to the front portion. Bulkhead mount pillars and a bulkhead mount crossmember couple the front structural bulkhead to the passenger cabin portion. The front structural bulkhead includes a modular chassis for supporting drivetrain components that are operably coupled with front wheels of the vehicle. The front structural bulkhead includes upper and lower mounting points configured to receive front suspension controls arms. The upper and lower mounting points are configured to allow the front wheels to move vertically due to the vehicle traveling over terrain.

20 Claims, 9 Drawing Sheets

FRONT STRUCTURAL BULKHEAD FOR VEHICLE CHASSIS

PRIORITY

This application is a continuation-in-part of, and claims the benefit of, U.S. patent application, entitled "Front Structural Bulkhead For Vehicle Chassis," filed on Mar. 21, 2022, and having application Ser. No. 17/700,197, which claims the benefit of, and priority to, U.S. Provisional application, filed on Mar. 22, 2021 and having application Ser. No. 63/164,079, the entirety of each of said applications being incorporated herein by reference.

FIELD

Embodiments of the present disclosure generally relate to the field of vehicle chassis systems. More specifically, embodiments of the disclosure relate to an apparatus and methods for a front structural bulkhead that is configured to improve the strength of an off-road vehicle chassis.

BACKGROUND

Off-road vehicles enjoy an enthusiastic following because of their many uses and versatility. As a result, several types of motorsports involve racing of various types of off-road vehicles. For example, competitions exist that are dedicated to various types of terrain, such as rally, desert racing, and rock-crawling. Besides their use in various motorsports, off-road vehicles commonly are used for sight-seeing and traveling to areas that may not be accessed by way of standard, paved roads.

The use of higher clearance, higher traction vehicles enables off-road vehicles to access trails and roads having rough, low traction surfaces that may not be traversed using a standard, on-road vehicle. As such, off-road vehicles typically comprise larger wheels, wider tires, and suspension configurations that are specifically engineered for use in off-road applications. As a consequence of such suspension configurations, as well as the rough terrain typically traversed, driver and passenger safety is a crucial concern. For example, drivers and passengers typically must be wear safety restraints during off-road travel. A wide variety of different types of safety harnesses are available for use with off-road vehicles.

Unlike on-road vehicles, such as passenger cars, off-road vehicles typically are open, often lacking windows, doors, and body panels common to passenger cars. A chassis comprising a structural arrangement of welded tubes typically is configured to support components of the off-road vehicle. For example, a front portion of the chassis is configured to support a front suspension of the off-road vehicle and various components of the off-road vehicle, such as a steering gear, a front differential, and the like. A rear portion of the chassis is configured to support a rear suspension of the off-road vehicle, such as rear trailing arms, as well as support various drivetrain components, such as a transaxle, a rear differential, an engine, and the like. Further, a roll cage or canopy comprising a welded tube structure coupled to the chassis is configured to protect the driver and passengers in the event of a rollover situation.

Given that off-road vehicles routinely travel over very rough terrain, such as mountainous regions, and are prone to tipping over, there is a desire to improve the mechanical strength, safety, convenience, and comfort of off-road vehicles, while at the same improving the performance of such vehicles.

SUMMARY

An apparatus and methods are provided for a front structural bulkhead for improving the strength of an off-road vehicle chassis. The chassis is a welded-tube variety of chassis that includes a front portion and a rear portion that are joined to an intervening passenger cabin portion. Frontward stays and a bulkhead mount couple the front structural bulkhead to the front portion. Bulkhead mount pillars and a bulkhead mount crossmember couple the front structural bulkhead to the passenger cabin portion. The front structural bulkhead includes a modular chassis for supporting drivetrain components that are operably coupled with front wheels of the vehicle. The front structural bulkhead includes upper and lower mounting points configured to receive front suspension controls arms. The upper and lower mounting points are configured to allow the front wheels to move vertically due to the vehicle traveling over terrain.

In an exemplary embodiment, a front structural bulkhead for an off-road vehicle comprises: a modular chassis for supporting drivetrain components that are operably coupled with front wheels of the vehicle; upper mounting points for coupling with upper control arms comprising a front suspension; lower mounting points for coupling with lower control arms comprising the front suspension; and a steering gear for steering the front wheels.

In another exemplary embodiment, the drivetrain components include any one or more of a transaxle, a front differential, a steering gear, a braking system, and the like. In another exemplary embodiment, the steering gear is coupled with steering rods such that turning the steering gear by way of a steering wheel of the vehicle causes the front wheels to articulate horizontally. In another exemplary embodiment, the upper mounting points and the lower mounting points are configured to allow the front wheels to move vertically due to the vehicle traveling over terrain.

In another exemplary embodiment, the upper mounting points are configured to receive inboard joints comprising upper control arms. In another exemplary embodiment, the lower mounting points are configured to receive inboard joints comprising lower control arms.

In an exemplary embodiment, a method for supporting drivetrain components comprises: obtaining a modular chassis for supporting the drivetrain components; installing the drivetrain components onto the modular chassis; mounting a front suspension onto the modular chassis; and coupling the modular chassis with a front portion of a vehicle chassis.

In another exemplary embodiment, mounting the front suspension includes coupling upper control arms comprising the front suspension with upper mounting points comprising the modular chassis. In another exemplary embodiment, mounting the front suspension includes coupling lower control arms comprising the front suspension with lower mounting points comprising the modular chassis. In another exemplary embodiment, mounting the front suspension includes coupling upper control arms and lower control arms with a spindle assembly. In another exemplary embodiment, mounting the front suspension includes coupling a steering gear with the spindle assembly by way of a steering rod.

In another exemplary embodiment, installing the drivetrain components includes installing any one or more of a transaxle, a front differential, a steering gear, a braking system onto the modular chassis. In another exemplary embodiment, coupling the modular chassis includes coupling the modular chassis to frontward stays comprising the vehicle chassis. In another exemplary embodiment, coupling the modular chassis includes coupling the modular chassis to bulkhead mount pillars comprising the vehicle chassis. In another exemplary embodiment, coupling the modular chassis includes coupling front struts between lower control arms and a front strut crossmember comprising the vehicle chassis.

In an exemplary embodiment, a front structural bulkhead for an off-road vehicle comprises: a modular chassis for supporting drivetrain components that are operably coupled with front wheels of the vehicle; a top portion configured to couple to a bulkhead mount of a chassis of the vehicle; and a rear portion configured to couple to a rear bulkhead mount of the chassis.

In another exemplary embodiment, the bulkhead mount is disposed at a bottom of a front portion of the chassis. In another exemplary embodiment, the bulkhead mount is connected to a front hoop of the front portion by way of frontward stays. In another exemplary embodiment, the bulkhead mount is configured to be attached to the top portion by way of a plurality of fasteners. In another exemplary embodiment, the frontward stays and the front hoop support the top portion of the front structural bulkhead.

In another exemplary embodiment, the rear bulkhead mount is disposed at a frontmost position of a floor hoop comprising a passenger cabin portion of the chassis. In another exemplary embodiment, the rear bulkhead mount is attached to bulkhead mount pillars that extend vertically from the floor hoop to a bulkhead mount crossmember disposed between hinge pillars comprising the passenger cabin portion. In another exemplary embodiment, the bulkhead mount pillars and the bulkhead mount crossmember are configured to support the rear portion of the front structural bulkhead. In another exemplary embodiment, the rear bulkhead mount comprises a substantially flat surface and includes lower mount holes, upper mount holes, and lip portions.

In another exemplary embodiment, the lip portions are peripherally disposed at a top and both sides of the rear bulkhead mount to advantageously align the rear portion with the rear bulkhead mount. In another exemplary embodiment, the lower mount holes align with holes comprising lower mounting points of the front structural bulkhead. In another exemplary embodiment, a bolt may be extended through the holes and tightened into the lower mounting hole to fasten the rear portion to the rear bulkhead mount. In another exemplary embodiment, the bolt serves a dual purpose of supporting a rearmost inboard lower control arm joint that couples a lower control arm to the front structural bulkhead. In another exemplary embodiment, the upper mount holes align with various holes disposed in the rear portion. In another exemplary embodiment, bolts may be extended through the holes disposed in the rear portion and tightened to fasten the rear portion to the rear bulkhead mount.

In another exemplary embodiment, the bulkhead mount and the rear bulkhead mount are disposed at an angle with respect to one another to accommodate an angular relationship between the top portion and the rear portion. In another exemplary embodiment, the angle is substantially a 90-degree angle.

In another exemplary embodiment, the rear bulkhead mount comprises a substantially flat surface and includes lower mount holes that receive lower dowels and upper mount holes that include upper dowels. In another exemplary embodiment, the lower dowels comprise lower mounting points that support rearmost inboard lower control arm joints that couple lower control arms to the front structural bulkhead and fasten the rear portion to the rear bulkhead mount. In another exemplary embodiment, the upper dowels comprise upper mounting points that fasten the rear portion to the rear bulkhead mount and support rearmost inboard upper control arm joints that couple upper control arms to the front structural bulkhead.

These and other features of the concepts provided herein may be better understood with reference to the drawings, description, and appended claims.

BRIEF DESCRIPTION OF THE DRAWINGS

The drawings refer to embodiments of the present disclosure in which.

Figure 1:
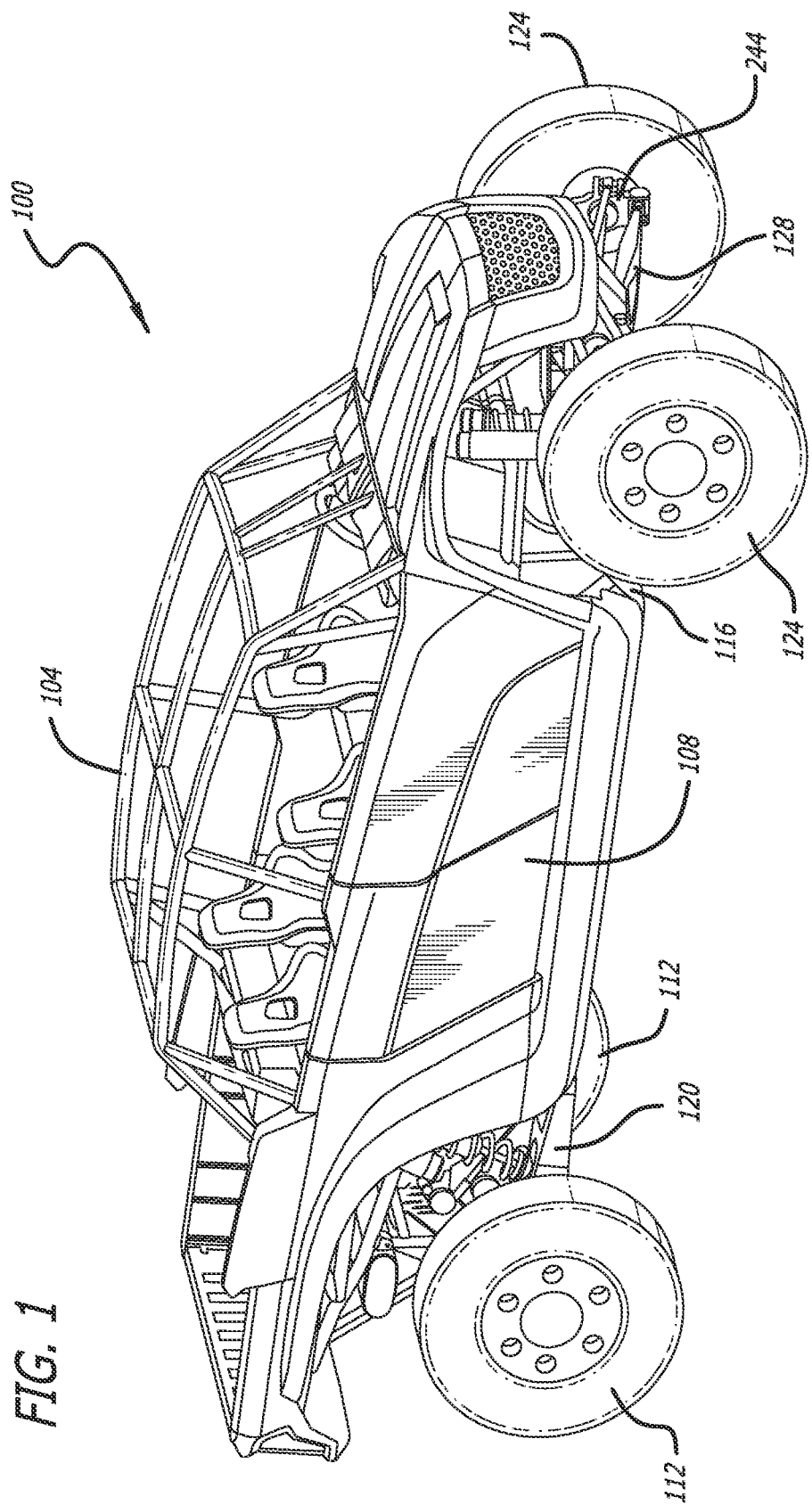
FIG. 1 illustrates an exemplary embodiment of an off-road vehicle that is configured to seat up to four occupants and includes a front structural bulkhead in accordance with the present disclosure.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the front structural bulkhead and methods disclosed herein may be practiced without these specific details. In other instances, specific numeric references such as "first tube," may be made. However, the specific numeric reference should not be interpreted as a literal sequential order but rather interpreted that the "first tube" is different than a "second tube." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Off-road vehicles typically comprise larger wheels, wider tires, and suspension configurations that are specifically engineered for use in off-road applications. As a consequence of such suspension configurations, as well as the rough terrain typically traversed, driver and passenger safety is a crucial concern. Given that off-road vehicles routinely travel over very rough terrain, such as mountainous regions, and are prone to tipping over, there is a desire to improve the mechanical strength, safety, convenience, and comfort of off-road vehicles, while at the same improving the performance of such vehicles. Embodiments disclosed herein provide an apparatus and methods for a front structural bulkhead that is configured to improve the strength of an off-road vehicle chassis.

FIG. 1 shows an off-road vehicle 100 that is particularly suitable for implementation of a front structural bulkhead in accordance with the present disclosure. As disclosed hereinabove, the off-road vehicle 100 generally is of a Utility Task Vehicle (UTV) variety that seats up to four occupants, includes a roll-over protection system 104, and may have a cab enclosure 108. Rear wheels 112 of the off-road vehicle 100 may be operably coupled with a chassis 116 by way of a trailing arm suspension system 120. Front wheels 124 may be operably coupled with the chassis 116 by way of a front suspension system 128. It should be understood, however, that the front structural bulkhead disclosed herein is not to be limited to the specific off-road vehicle 100 shown in FIG. 1, but rather the front structural bulkhead may be incorporated into a wide variety of vehicles, other than the off-road vehicle 100 of FIG. 1, without limitation.

Figure 2:
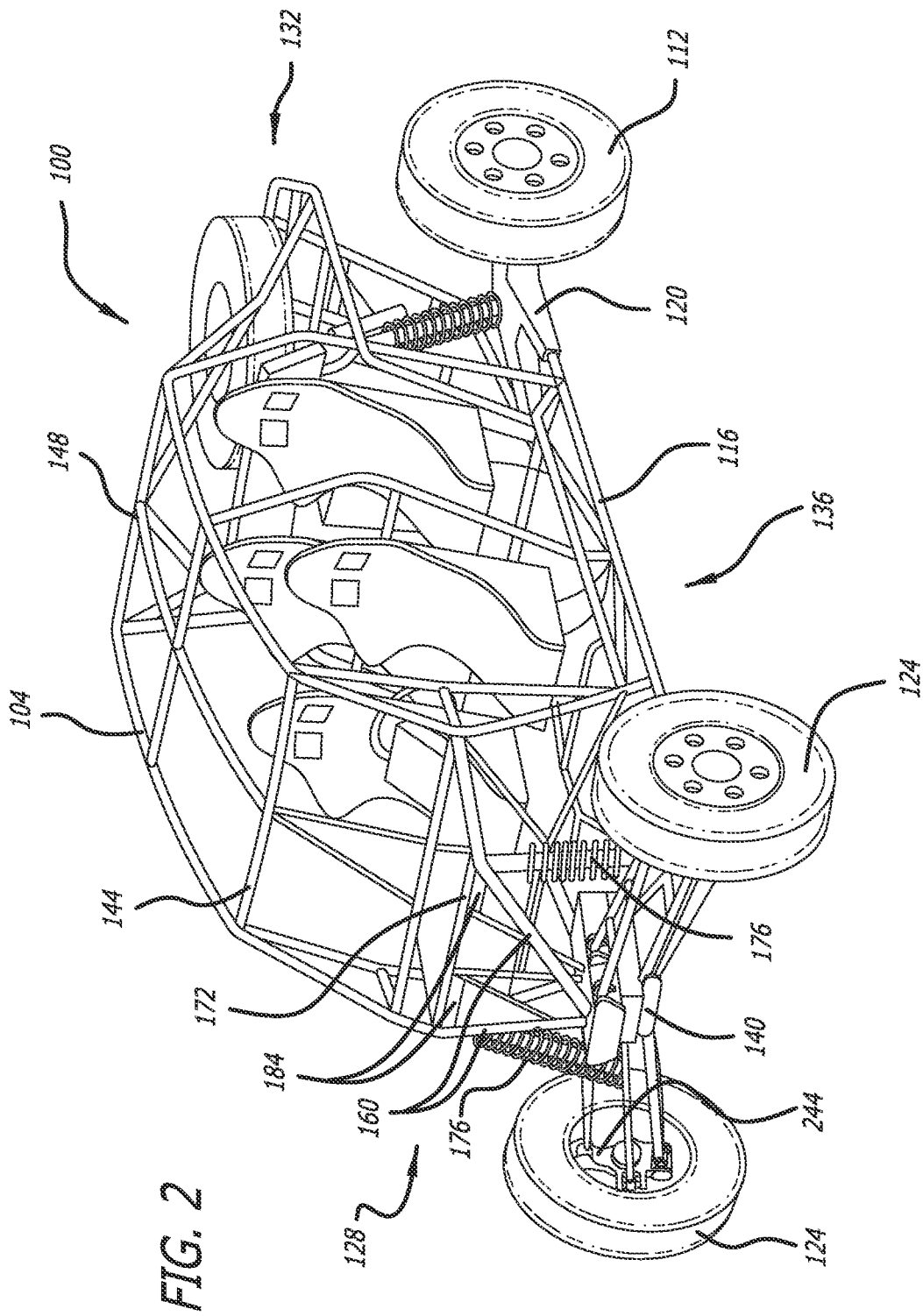
FIG. 2 illustrates an exemplary embodiment of an off-road vehicle that includes a front structural bulkhead in accordance with the present disclosure.

FIG. 2 illustrates an exemplary embodiment of an off-road vehicle 100 that includes a front structural bulkhead 140 in accordance with the present disclosure. In the embodiment illustrated in FIG. 2, the cab enclosure 108 and other body panels are removed to reveal the chassis 116 and the front structural bulkhead 140 comprising the off-road vehicle 100. The chassis 116 generally is a welded-tube variety of chassis that includes a front portion 128 and a rear portion 132 that are joined to an intervening passenger cabin portion 136. The passenger cabin portion 136 shown in FIG. 2 is configured to seat up to four occupants. A front canopy 144 and a rear canopy 148 are configured to impart structural integrity to the chassis 116 and to provide a roll-over protection system 104 to occupants of the off-road vehicle 100.

The front portion 128 generally is configured to support various components comprising the off-road vehicle 100, such as, by way of non-limiting example, the front suspension 128 and the front structural bulkhead 140. The rear portion 132 is configured to support the rear suspension 120 of the off-road vehicle 100, such as rear trailing arms, as well as support various drivetrain components, shown in FIG. 1, such as an engine, a transaxle, a rear differential, an engine, and the like.

As will be appreciated, the passenger cabin portion 136, as well as the front and rear portions 128, 132, are configured to distribute loading forces arising during operation of the vehicle 100 so as to resist damage to components comprising the vehicle 100 and to protect occupants riding within the vehicle 100. To this end, the front canopy 144 and the rear canopy 148 that are configured to be coupled with the chassis 116. More specifically, the front canopy 144 is configured to be coupled with the front portion 128, and the rear canopy 148 is configured to be coupled with the rear portion 132. Further, the front canopy 144 is configured to be coupled with the rear canopy 148. It should be recognized, therefore, that the front canopy 144 and the rear canopy 148 are configured to contribute to the overall integrity of the entire chassis 116.

Figure 3:
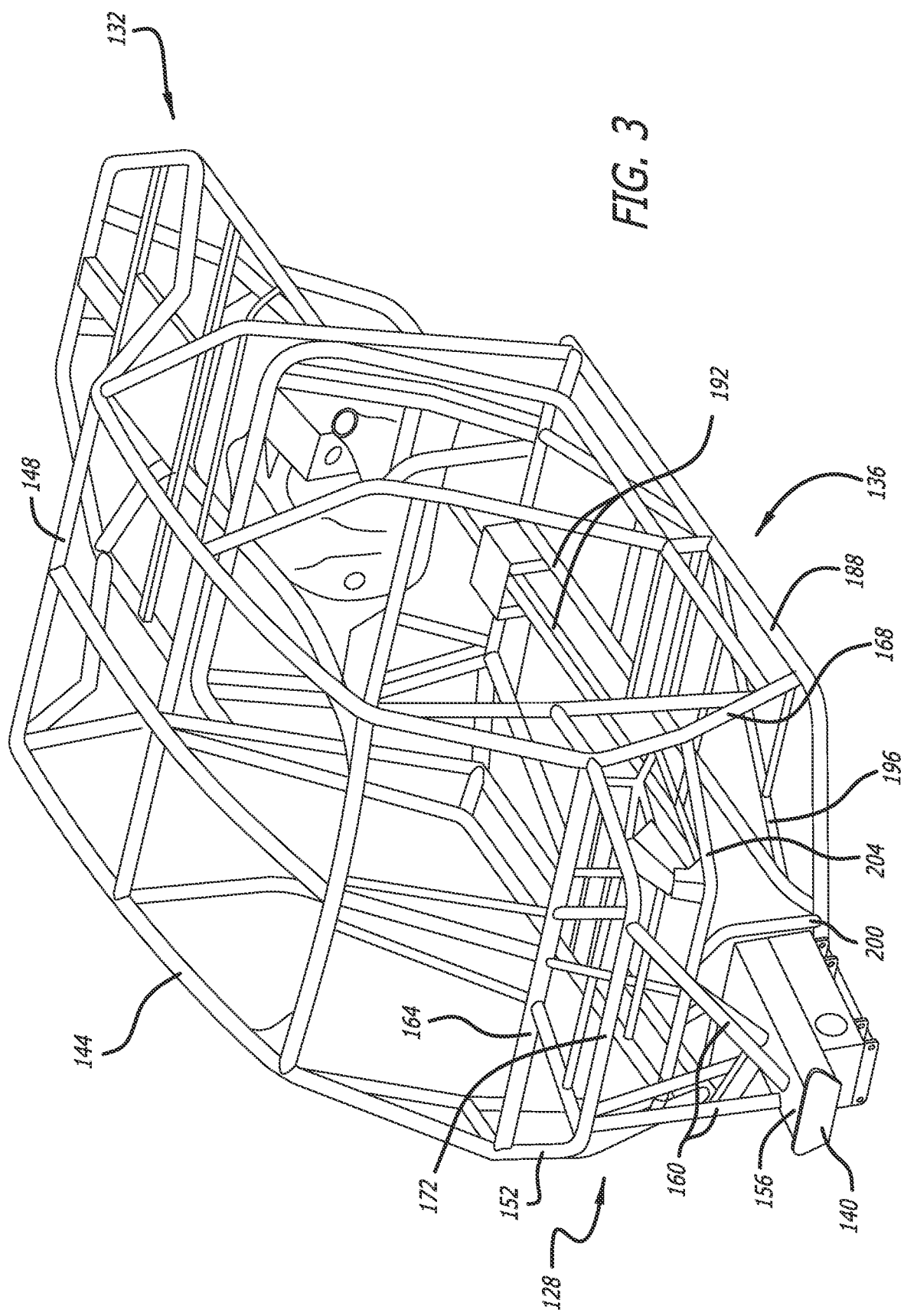
FIG. 3 illustrates an isometric view of an exemplary embodiment of vehicle chassis that includes a front structural bulkhead according to the present disclosure.

As mentioned above, the front portion 128 generally supports various components comprising the off-road vehicle 100, including the front suspension 128 and the front structural bulkhead 140. As shown in FIG. 3, the front portion 128 may be defined by a front hoop 152 at a top of the front portion 128 and a bulkhead mount 156 at a bottom of the front portion 128. Frontward stays 160 attach the front hoop 152 to the bulkhead mount 156. The bulkhead mount 156 is configured to be coupled with the front structural bulkhead 140 (see FIG. 2), which supports at least the front suspension 124 and includes a steering gear, a front differential, and the like. In some embodiments, the bulkhead mount 156 may be coupled with a modular front drivetrain that supports an entire front drivetrain and suspension assembly. In such applications, the modular front drivetrain advantageously enables the entire drivetrain and suspension assembly to be quickly and easily replaced in the event of a part failure, unlike in the case of conventional off-road vehicles that may be sidelined during a race due to the failure of an individual part comprising the drivetrain or the suspension. The frontward stays 160 operate to couple the modular front drivetrain to the chassis 116. Opposite of the frontward stays 160, the front hoop 152 is joined to opposite ends of a dash bar 164 and hinge pillars 168 comprising the passenger cabin portion 136.

Figure 4:
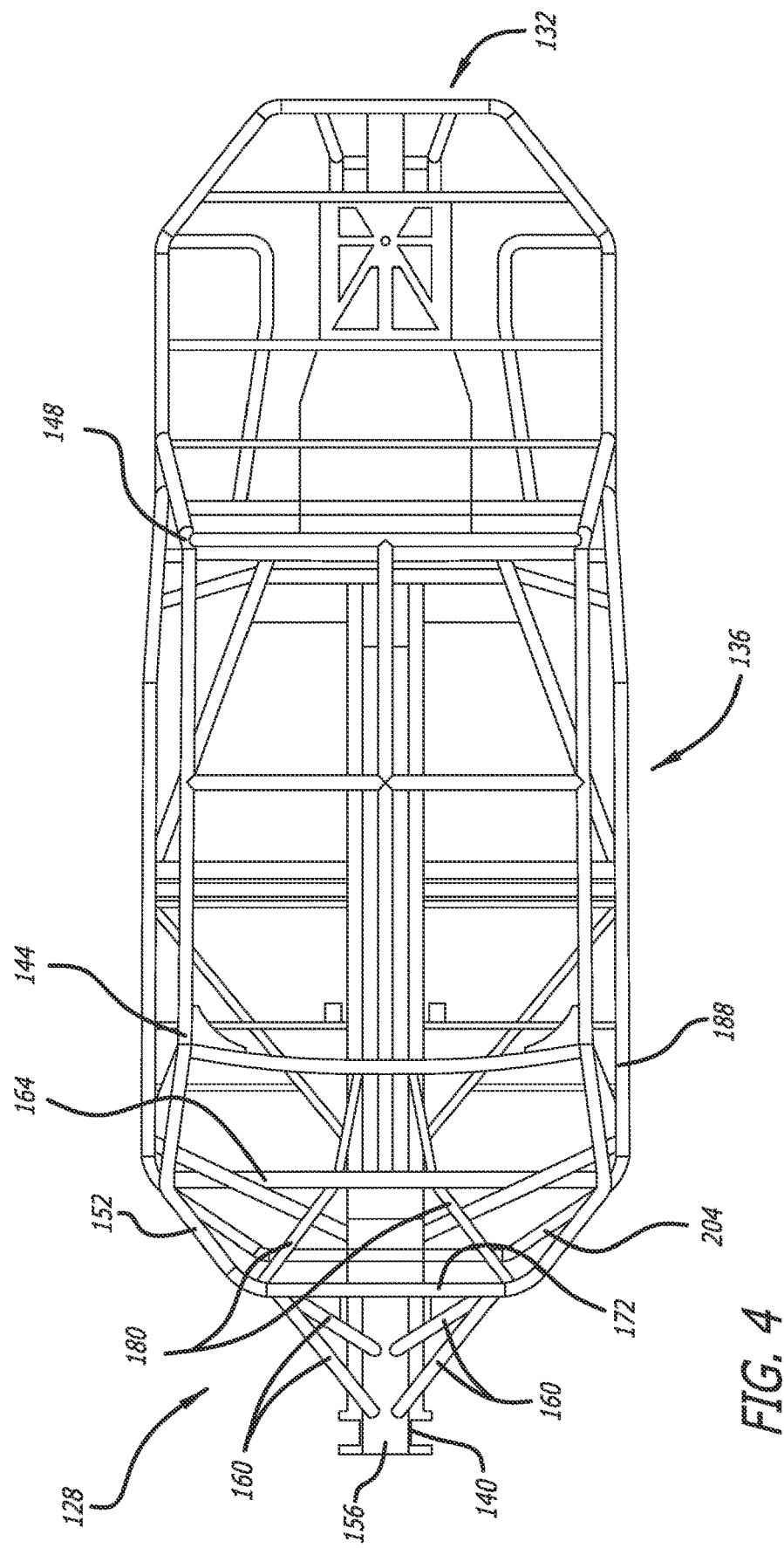
FIG. 4 illustrates a top plan view of the vehicle chassis of FIG. 3, in accordance with the present disclosure.
Figure 6:
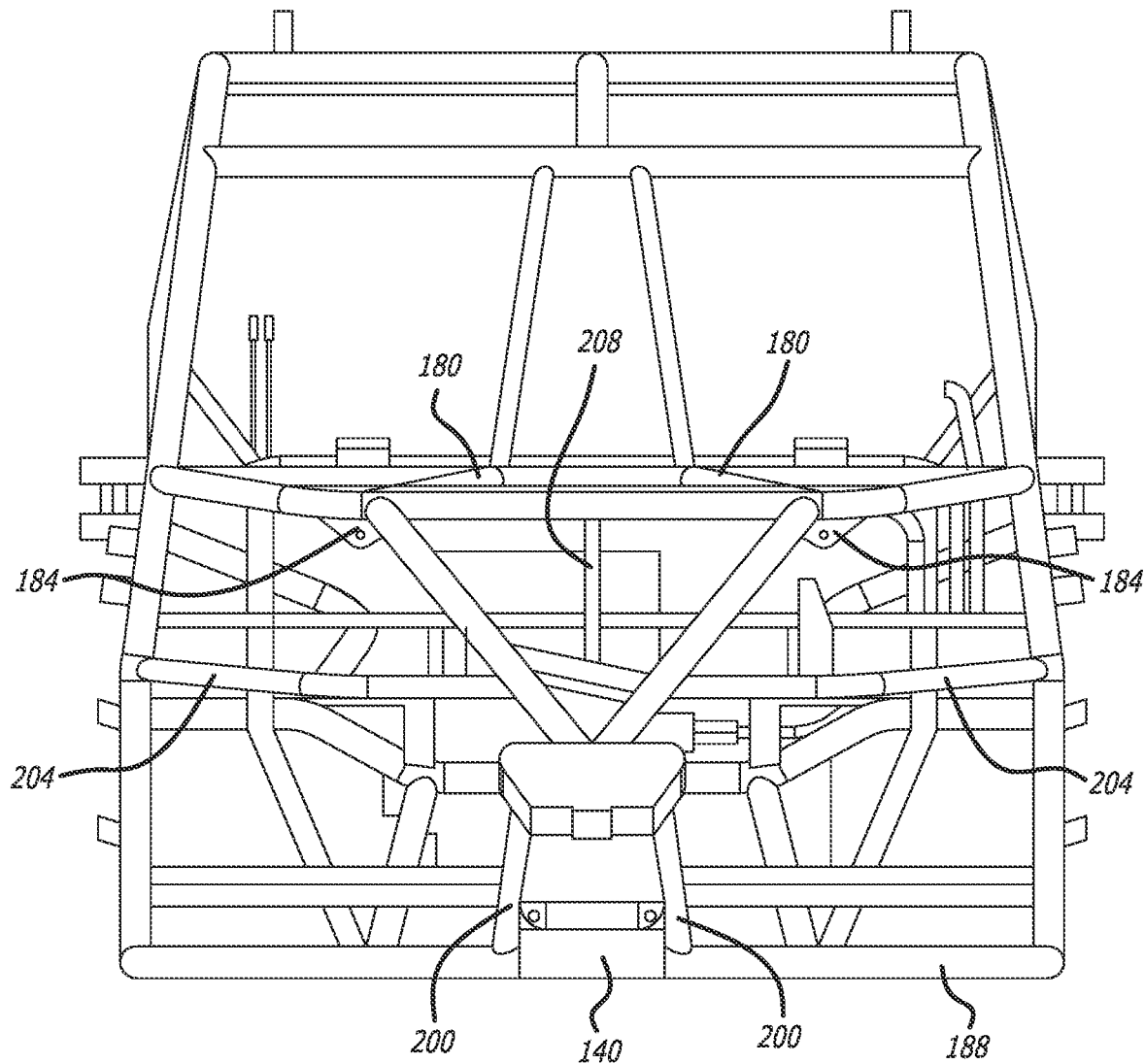
FIG. 6 illustrates a front view of the vehicle chassis of FIG. 4, showing a front structural bulkhead coupled with the vehicle chassis, in accordance with the present disclosure.

With continuing reference to FIG. 3, a front strut crossmember 172 comprises a portion of the front hoop 152 between the driver-side and passenger-side of the front hoop 152. The front strut crossmember 172 provides a means for coupling front struts 176 to the chassis 116, as shown in FIG. 2. As best shown in FIG. 4, front strut braces 180 are disposed between the front strut crossmember 172 and the dash bar 164. The front strut braces 180 are configured to reinforce the front strut crossmember 172, such that loading on the front strut crossmember 172 by the front struts 176 and the bulkhead 140 is distributed to the dash bar 164. As shown in FIG. 6, one end of each front strut brace 180 is coupled to a location of a front strut crossmember 172 that is above a top mount 184 of each front strut 176 (see FIG. 2). Further, each front strut brace 180 is coupled to the front strut crossmember 172 near the joining of the forward stays 160 and the front strut crossmember 172. As such, forces on the front strut crossmember 172 by the front struts 176 and the bulkhead 140, during operation of the vehicle 100, are shared by the dash bar 164.

With continuing reference to FIG. 3, the floor hoop 188 generally defines a floor of the passenger cabin portion 136. Longitudinal floor bars 192 and crossmembers 196 coupled with the floor hoop 188 impart structural strength to the passenger cabin portion 136 and facilitate coupling various components to the floor of the passenger cabin portion 136. At a front-most position of the floor hoop 188 bulkhead mount pillars 200 extend vertically to a bulkhead mount crossmember 204 disposed between the hinge pillars 168.

Figure 5:
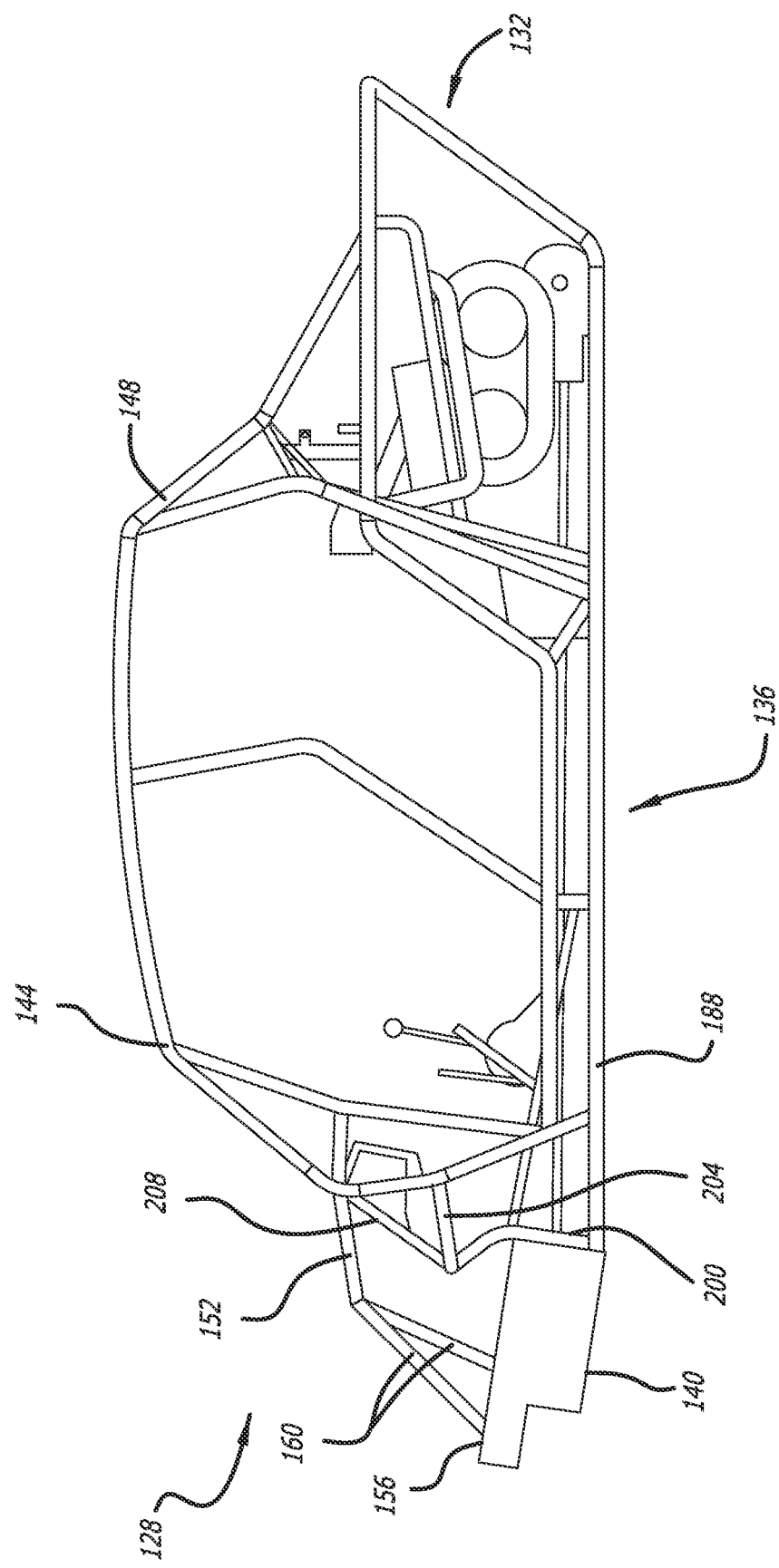
FIG. 5 illustrates a side plan view of the vehicle chassis of FIG. 4 according to the present disclosure.

As best shown in FIGS. 4-5, the bulkhead mount pillars 200 and the bulkhead mount crossmember 204 serve to support a rear portion of the bulkhead 140. Further, a brace 208 extends from a midpoint of the bulkhead mount crossmember 204 to the dash bar 164. As such, loading on the bulkhead mount crossmember 204, during operation of the vehicle 100, is distributed throughout the chassis 116.

Figure 7:
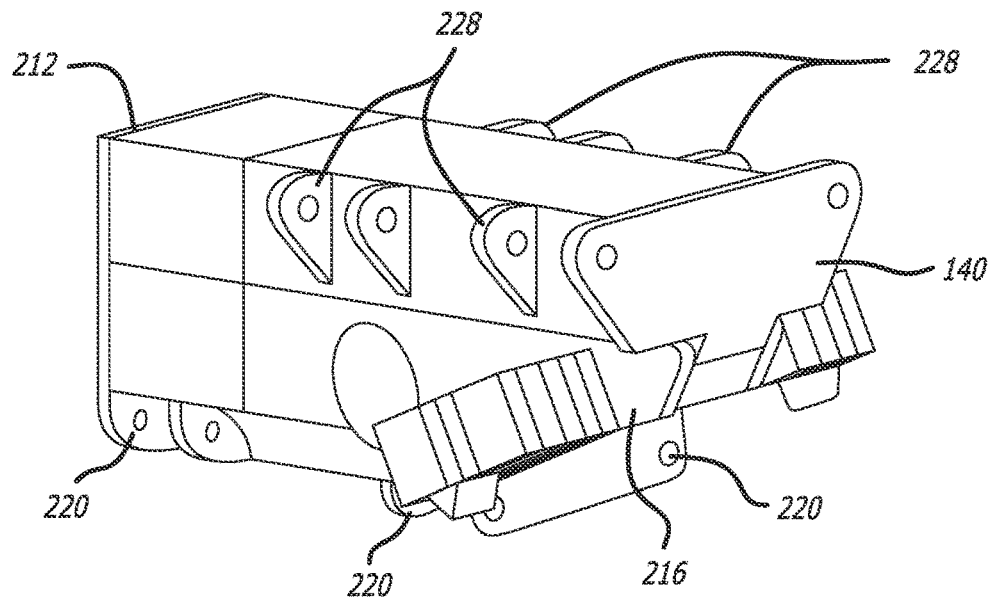
FIG. 7 illustrates a perspective view of an exemplary embodiment of a front structural bulkhead that may be incorporated into an off-road vehicle in accordance with the present disclosure.

FIG. 7 illustrates a perspective view of an exemplary embodiment of a front structural bulkhead 140 that may be incorporated into an off-road vehicle 100 in accordance with the present disclosure. The front structural bulkhead 140 includes a modular chassis 212 that may support any one or more of a transaxle, a front differential, a steering gear 216, a braking system, and the like, that are operably coupled with the front wheels 124 by way of the front suspension system 128, as shown in FIGS. 1-2. Further, the modular chassis 212 provides mounting points for the front suspension 128, in lieu of conventional mounting points that comprise portions of the chassis 116 of the vehicle 100. In particular, the modular chassis 212 includes lower mounting points 220 for coupling with lower control arms 224 (see FIG. 8) comprising the front suspension 128. Further, the modular chassis 212 includes upper mounting points 228 for coupling with upper control arms 232 comprising the front suspension 128. It is to be understood, therefore, that the front structural bulkhead 140 comprises a single drivetrain/suspension assembly that may be installed onto and removed from the vehicle 100, unlike a conventional drivetrain and suspension that comprise multiple components that must be individually assembled onto the chassis 116 of the vehicle 100. Further, the front structural bulkhead 140 integrates the transaxle, the front differential, the steering gear 216, and the front suspension system into the chassis 116.

It is contemplated that the modular chassis 212 may include a braking system configured to enable a practitioner to slow the rotation rate of the front wheel 124 during operation of the vehicle 100. For example, in some embodiments, brake calipers may be fastened onto the modular chassis 212 such that brake discs coupled to drive axles of the vehicle 100 pass within the brake caliper. Thus, when the practitioner depresses a brake pedal of the vehicle 100 the brake calipers apply pressure to the brake discs, slowing the rotation rate of the front wheels 124. The brake calipers may be cable operated or may be operated by way hydraulic lines. Although not shown herein, the brake discs may be coupled with a hub comprising the front differential. In some embodiments, however, the brake discs may be coupled with constant velocity joints that are coupled with the hub of the front differential. It is contemplated that the brake calipers and the brake discs may be incorporated into the front structural bulkhead 140 in a wide variety of configurations, without limitation, and without deviating beyond the scope of the present disclosure.

As disclosed hereinabove, the front structural bulkhead 140 also supports the steering gear 216 and steering rods 236 (see FIG. 8), such that turning the steering gear 216, by way of a steering wheel of the vehicle 100, causes the front wheels 124 to articulate horizontally with respect to the front structural bulkhead 140. Further, the upper and lower mounting points 228, 220 comprising the modular chassis 212 are configured to allow the front wheels 124 to move vertically from a low position (e.g., due to "maximal bounce") to a high position (e.g., due to "maximal bump"). As such, the front structural bulkhead 140 is not limited to the specific configuration shown in FIG. 7, but rather the configuration of the front structural bulkhead 140 may be varied in accordance with the configuration of each of the components comprising the front suspension system 128, without limitation.

Moreover, the front structural bulkhead 140 generally may be varied in accordance with the specific type of vehicle 100 into which the front structural bulkhead 140 is to be implemented. It is contemplated that the front structural bulkhead 140 may be implemented in any of various off-road vehicles 100, such as, by way of non-limiting example, Utility Task Vehicles (UTVs), Recreational Off-Highway Vehicles (ROVs), or Multipurpose Off-Highway Utility Vehicles (MOHUVs), without limitation. As such, the front structural bulkhead 140 is particularly well-suited for off-road racing applications, such as desert racing, short course racing, hill climbing, rallying, and the like.

Figure 8:
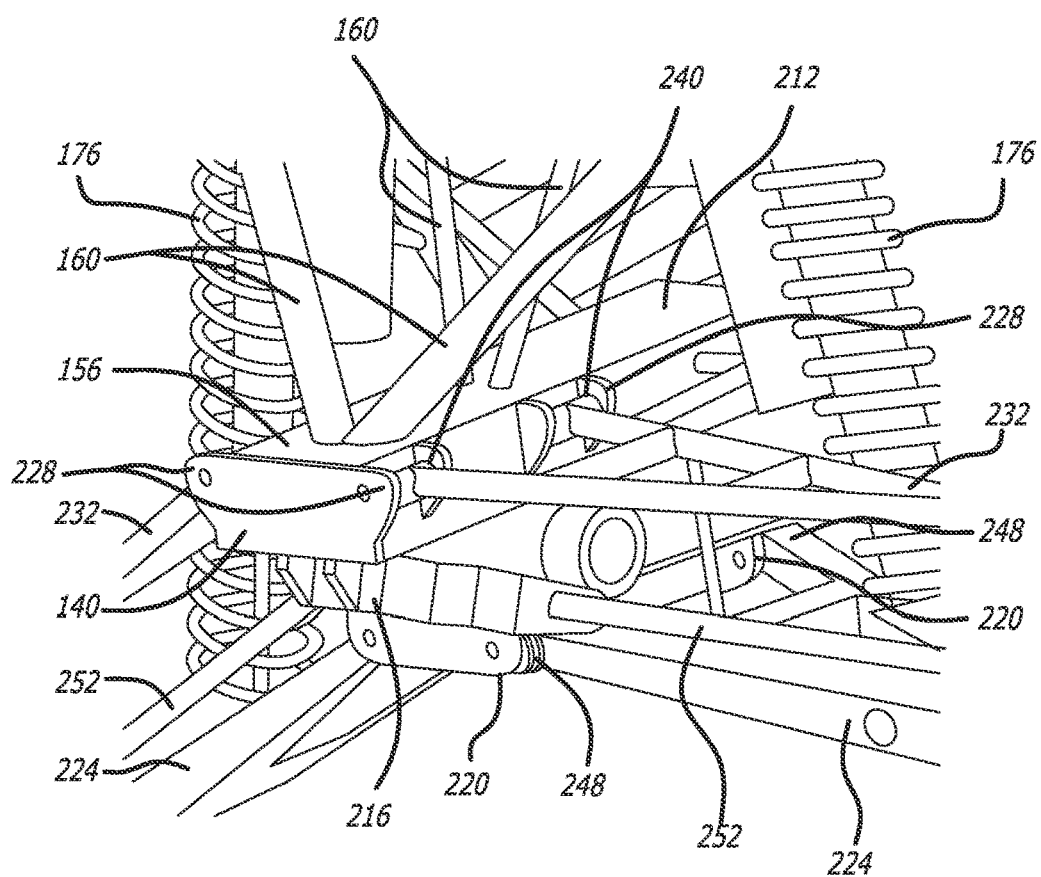
FIG. 8 illustrates a close-up view of an exemplary embodiment of a front structural bulkhead incorporated into an off-road vehicle, according to the present disclosure.

FIG. 8 illustrates a close-up view of an exemplary embodiment of the front structural bulkhead 140 incorporated into the off-road vehicle 100, according to the present disclosure. As shown in FIG. 8, an upper control arm (UCA) 232 and a lower control arm (LCA) 224 comprising the front suspension system 128 couple the front wheels 124 (see FIGS. 1-2) with the front structural bulkhead 140. The UCA 232 comprises two inboard UCA joints 240 that couple the UCA 232 to upper mounting points 228 of the front structural bulkhead 140 and an outboard UCA joint (not shown) that couples the UCA 232 to a spindle assembly 244 (see FIGS. 1-2). The LCA 224 includes two inboard LCA joints 248 that couple the LCA 224 to the front structural bulkhead 140 and an outboard LCA joint (not shown) that couples the LCA 224 to the spindle assembly 244.

As will be recognized, the UCA and LCA 232, 224 generally are of a double wishbone variety of suspension that facilitates vertical motion of the front wheels 124 during travel over terrain, as well as facilitating horizontal turning of the front wheels 124 during steering of the vehicle 100 by way of the steering gear 216 (see FIG. 7). The UCA and LCA 232, 224 further facilitate controlling various parameters affecting the orientation of the front wheels 124 with respect to the off-road vehicle 100, such as, by way of non-limiting example, camber angle, caster angle, toe pattern, roll center height, scrub radius, and scrub. Further, a steering rod 252 coupling each front wheel 124 (see FIGS. 1-2) with the steering gear 216 mounted on the front structural bulkhead 140 allows for vertical movement and horizontal turning of the front wheels 124 during operation of the vehicle 100.

In addition to the off-road applications discussed above, it is contemplated that, in some embodiments, the front structural bulkhead 140 may be incorporated into racing vehicles that are not necessarily intended for off-road racing. For example, the front structural bulkhead 140 may be incorporated into racing vehicles that may be used for any of formula racing, sports car racing, stock car racing, drag racing, touring car racing, production car racing, as well as amateur open-wheel racing applications, such as karting, and the like, without limitation.

Figure 9:
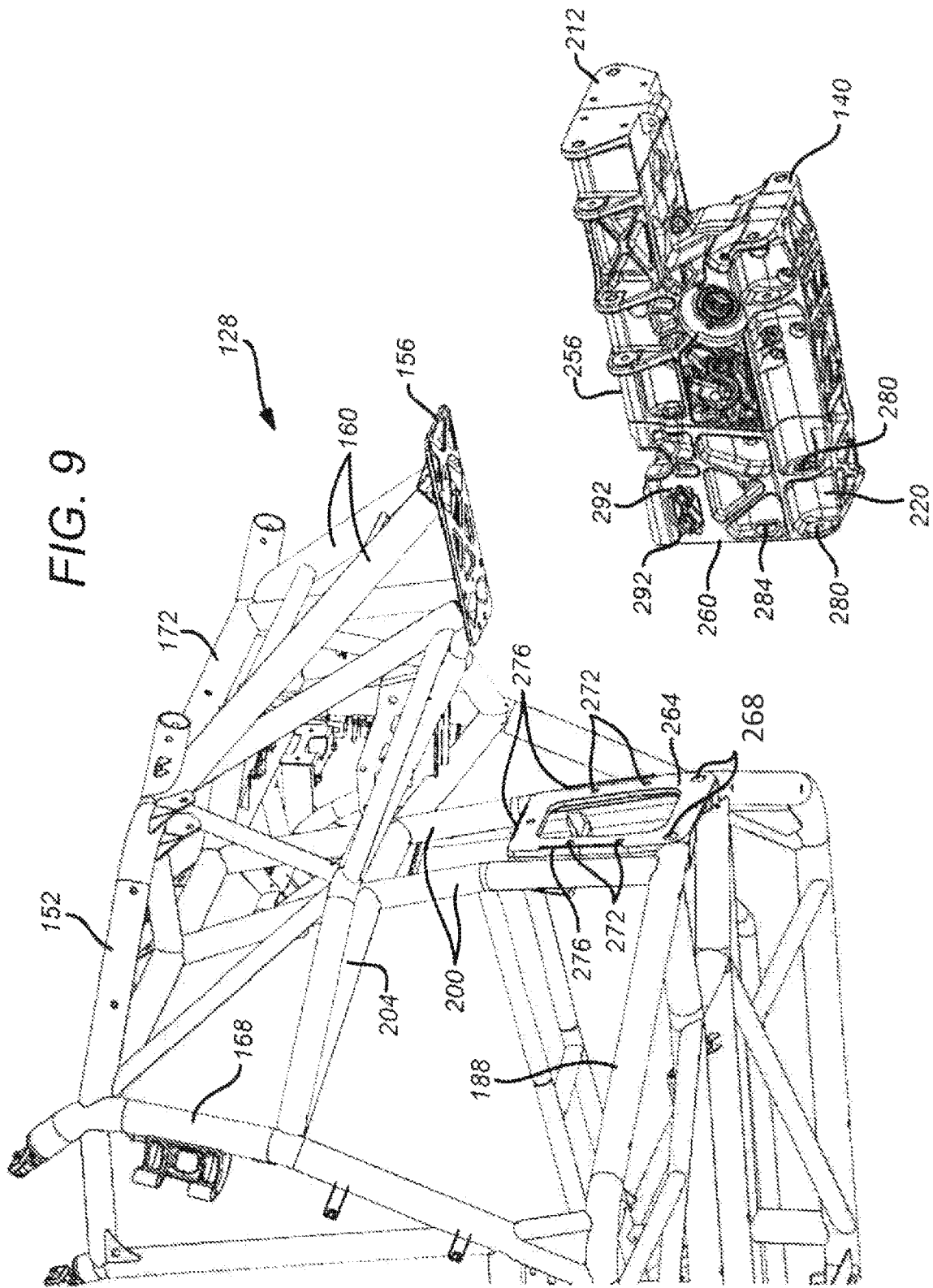
FIG. 9 illustrates an exploded perspective view of an exemplary embodiment of a front portion of a tube-frame chassis and a front structure bulkhead that may be coupled together to form a vehicle chassis.

FIG. 9 illustrates an exploded perspective view of an exemplary embodiment of a front portion 128 of a tube-frame chassis and a front structure bulkhead 140 that may be coupled together to form a vehicle chassis 116 (see FIG. 1). As shown in FIG. 9, the front portion 128 may be defined by a front hoop 152 at a top of the front portion 128 and a bulkhead mount 156 at a bottom of the front portion 128. Frontward stays 160 attach the front hoop 152 to the bulkhead mount 156. The bulkhead mount 156 is configured to be coupled with a top portion 256 of the front structural bulkhead 140, as described with respect to FIG. 2. As will be appreciated, a plurality of fasteners, such as nuts, bolts, threaded studs, and the like, may be used to fasten the top of the front structural bulkhead 140 to the bulkhead mount 156.

With continuing reference to FIG. 9, the floor hoop 188 generally defines a floor of the passenger cabin portion 136, as described with respect to FIG. 3. At a front-most position of the floor hoop 188, bulkhead mount pillars 200 extend vertically to a bulkhead mount crossmember 204 disposed between the hinge pillars 168. As such, the bulkhead mount pillars 200 and the bulkhead mount crossmember 204 serve to support a rear portion 260 of the front structural bulkhead 140.

In the embodiment illustrated in FIG. 9, a rear bulkhead mount 264 is coupled with the bulkhead mount pillars 200 and configured to receive the rear portion 260 of the front structural bulkhead 140. To this end, the rear bulkhead mount 264 comprises a substantially flat surface and includes lower mount holes 268, upper mount holes 272, and lip portions 276. The lip portions 276 are peripherally disposed at a top and both sides of the rear bulkhead mount 264 to advantageously align the rear portion 260 of the front structural bulkhead 140 with the rear bulkhead mount 264. The lower mount holes 268 align with holes 280 comprising the lower mounting point 220. As such, a bolt or other threaded fastener may be extended through the holes 280, 268 and tightened to fasten the rear portion 260 to the rear bulkhead mount 264. Further, such a bolt may serve a dual purpose of supporting the rearmost inboard LCA joint 248 that couples the LCA 224 to the front structural bulkhead 140 as shown in FIG. 8.

The upper mounting holes 272 may be configured to align with various holes disposed in the rear portion 260, such as holes 284. Fasteners, such as bolts, may be extended through the holes 284, 272 and tightened to fasten the rear portion 260 to the rear bulkhead mount 264. It is contemplated that dowels may be inserted into any one or more of the holes 272 to engage with holes in the rear portion 260 so as to advantageously align the rear portion 260 of the front structural bulkhead 140 with the rear bulkhead mount 264.

It the embodiment illustrated in FIG. 9, the bulkhead mount 156 and the rear bulkhead mount 264 are disposed at substantially 90 degrees with respect to one another. As will be recognized, the 90-degree angle is configured to accommodate a right angular relationship between the top portion 256 and the rear portion 260 of the front structural bulkhead 140. It is contemplated, however, that in some embodiments the bulkhead mount 156 and the rear bulkhead mount 264 may be disposed at an angle other than a right angle. Thus, the angle between the top portion 256 and the rear portion 260 is not limited to being 90 degrees, but rather the angle between the top portion 256 and the rear portion 260 may comprise any angle that enables respectively coupling the top portion 256 and the rear portion 260 with the bulkhead mount 156 and the rear bulkhead mount 264.

Figure 10:
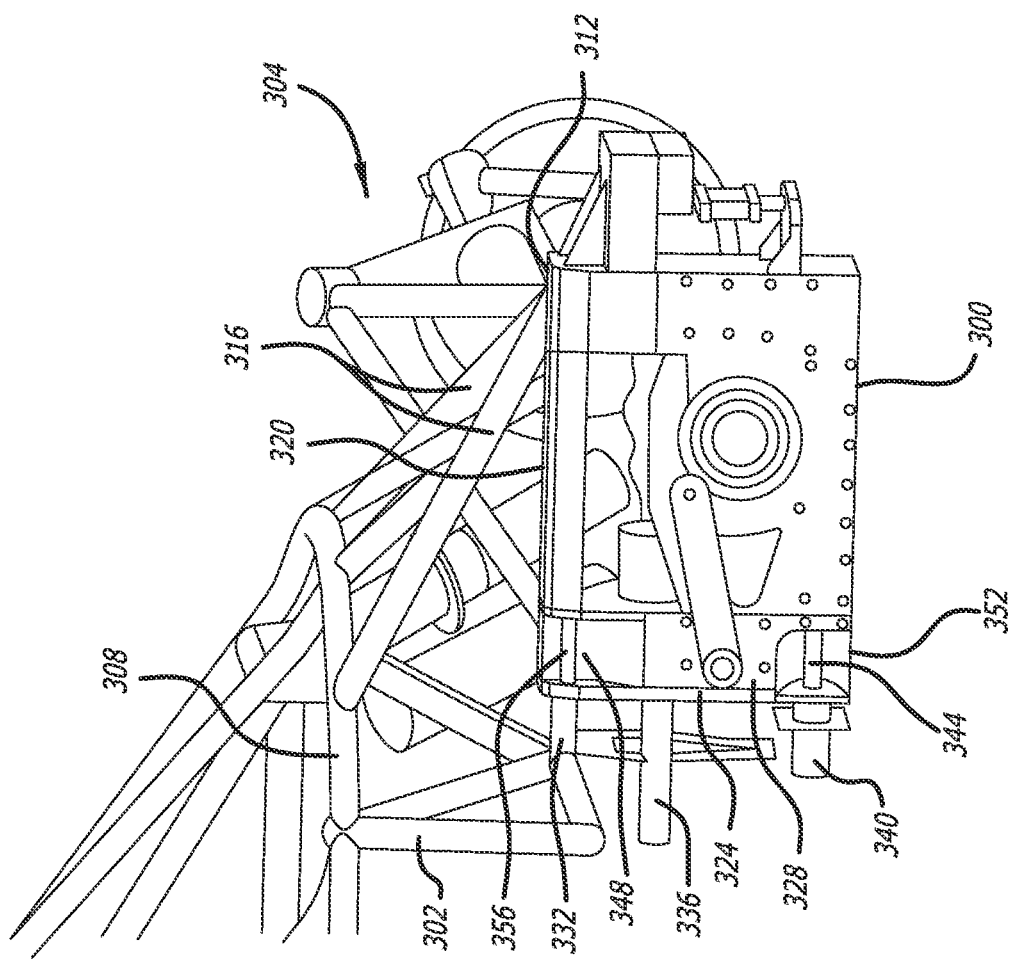
FIG. 10 illustrates a perspective view of an exemplary embodiment of a front structural bulkhead coupled with a front portion of a tube-frame chassis to form a truck chassis.

FIG. 10 illustrates a perspective view of an exemplary embodiment of a front structural bulkhead 300 coupled with a front portion 304 of a tube-frame chassis to form a truck chassis 302. The front portion 304 includes a front hoop 308 at a top of the front portion 304 and a bulkhead mount 312 at a bottom of the front portion 304. Frontward stays 316 attach the front hoop 308 to the bulkhead mount 312. The bulkhead mount 312 is configured to be coupled with a top portion 320 of the front structural bulkhead 300. As will be appreciated, a plurality of fasteners, such as nuts, bolts, threaded studs, and the like, may be used to fasten the top of the front structural bulkhead 300 to the bulkhead mount 312.

With continuing reference to FIG. 10, a rear bulkhead mount 324 is configured to be coupled with a rear portion 328 of the front structural bulkhead 300. The rear bulkhead mount 324 generally may comprise a front-most portion of a passenger cabin portion of the truck chassis 302. The rear bulkhead mount 324 is coupled with the truck chassis 302 by way of upper support members 332, middle support members 336, and lower support members 340. As such, the rear bulkhead mount 324 and the support members 332, 336, 340 serve to support the rear portion 328 of the front structural bulkhead 300. Thus, loading on the front structural bulkhead 300 is distributed through the truck chassis 302 by way of the support members 332, 336, 340.

In the illustrated embodiment, the rear bulkhead mount 324 comprises a substantially flat surface and includes lower mount holes that receive lower dowels 344 and upper mount holes that include upper dowels 348. The lower dowels 344 comprise lower mounting points 352 that support the rearmost inboard LCA joints 248 that couple the LCAs 224 to the front structural bulkhead 300, as described herein, as well as fasten the rear portion 328 to the rear bulkhead mount 324. The upper dowels 348 comprise upper mounting points 356 that are configured to fasten the rear portion 328 to the rear bulkhead mount 324 as well as support the rearmost inboard UCA joint 240 (see FIG. 8) that couples the UCA 232 to the front structural bulkhead 300. Further, it is contemplated that the rear bulkhead mount 324 may include any of various lip portions, dowels, and mounting holes suitable for advantageously aligning the rear portion 328 of the front structural bulkhead 300 with the rear bulkhead mount 324, as described herein.

It the embodiment illustrated in FIG. 10, the bulkhead mount 312 and the rear bulkhead mount 324 are disposed at substantially 90 degrees with respect to one another. As will be recognized, the 90-degree angle is configured to accommodate a right angular relationship between the top portion 320 and the rear portion 328 of the front structural bulkhead 300. It is contemplated, however, that in some embodiments the bulkhead mount 312 and the rear bulkhead mount 324 may be disposed at an angle other than a right angle. Thus, the angle between the top portion 320 and the rear portion 328 is not limited to being 90 degrees, but rather the angle between the top portion 320 and the rear portion 328 may comprise any angle that enables respectively coupling the top portion 320 and the rear portion 328 with the bulkhead mount 312 and the rear bulkhead mount 324.

While the front structural bulkhead and methods have been described in terms of particular variations and illustrative figures, those of ordinary skill in the art will recognize that the front structural bulkhead is not limited to the variations or figures described. In addition, where methods and steps described above indicate certain events occurring in certain order, those of ordinary skill in the art will recognize that the ordering of certain steps may be modified and that such modifications are in accordance with the variations of the front structural bulkhead. Additionally, certain of the steps may be performed concurrently in a parallel process when possible, as well as performed sequentially as described above. To the extent there are variations of the front structural bulkhead, which are within the spirit of the disclosure or equivalent to the front structural bulkhead found in the claims, it is the intent that this patent will cover those variations as well. Therefore, the present disclosure is to be understood as not limited by the specific embodiments described herein, but only by scope of the appended claims.

What is claimed is:

1. A front structural bulkhead for an off-road vehicle, comprising:
 a modular chassis configured for mounting components of a front drivetrain of the off-road vehicle, the components comprising a front differential;
 a top portion configured to couple to a bulkhead mount of the vehicle, wherein the top portion and the bulkhead mount are of a substantially flat profile, the bulkhead mount extends from a front hoop through a pair of V-shape frontward stays; and
 a rear portion configured to couple to a rear bulkhead mount of the chassis, wherein the rear portion and the rear bulkhead mount are of a substantially flat profile, the rear bulkhead mount is mounted on bulkhead mount pillars which extends between the a bulkhead mount crossmember and a floor hoop.

2. The front structural bulkhead of claim 1, wherein the bulkhead mount is disposed at a bottom of a front portion of the chassis.

3. The front structural bulkhead of claim 2, wherein the front hoop comprises a front strut crossmember, the front strut crossmember has a proximal end and a distal end, wherein the bulkhead mount has a proximal end and a distal end, wherein a first frontward stay of the pair of V-shape frontward stays extends between the proximal end of the front strut crossmember, the proximal end of the bulkhead mount, and the distal end of the bulkhead mount, wherein a second frontward stay of the pair of V-shape frontward stays extends between the distal end of the front strut crossmember, the proximal end of the bulkhead mount, and the distal end of the bulkhead mount.

4. The front structural bulkhead of claim 2, wherein the bulkhead mount is configured to be attached to the top portion by way of a plurality of fasteners.

5. The front structural bulkhead of claim 3, wherein the bulkhead mount is only supported by the pair of V-shape frontward stays.

6. The front structural bulkhead of claim 1, wherein the rear bulkhead mount is disposed at a frontmost position of the floor hoop comprising a passenger cabin portion of the chassis.

7. The front structural bulkhead of claim 6, wherein the bulkhead mount pillars extend vertically from the floor hoop to the bulkhead mount crossmember disposed between hinge pillars comprising the passenger cabin portion.

8. The front structural bulkhead of claim 7, wherein the bulkhead mount pillars and the bulkhead mount crossmember are configured to support the rear portion of the front structural bulkhead.

9. The front structural bulkhead of claim 7, wherein the rear bulkhead mount comprises lower mount holes, upper mount holes, and lip portions.

10. The front structural bulkhead of claim 9, wherein the lip portions are peripherally disposed at a top and both sides of the rear bulkhead mount to advantageously align the rear portion with the rear bulkhead mount.

11. The front structural bulkhead of claim 9, wherein the lower mount holes align with holes comprising lower mounting points of the front structural bulkhead.

12. The front structural bulkhead of claim 11, wherein a bolt is extended through one of the holes and tightened into one of the lower mount holes to fasten the rear portion to the rear bulkhead mount.

13. The front structural bulkhead of claim 12, wherein the bolt serves a dual purpose of supporting a rearmost inboard lower control arm joint that couples a lower control arm to the front structural bulkhead.

14. The front structural bulkhead of claim 9, wherein the upper mount holes align with various holes disposed in the rear portion.

15. The front structural bulkhead of claim 14, wherein bolts are extended through the holes disposed in the rear portion and tightened to fasten the rear portion to the rear bulkhead mount.

16. The front structural bulkhead of claim 1, wherein the bulkhead mount and the rear bulkhead mount are disposed at an angle with respect to one another to accommodate an angular relationship between the top portion and the rear portion.

17. The front structural bulkhead of claim 16, wherein the angle is substantially a 90-degree angle.

18. The front structural bulkhead of claim 1, wherein the rear bulkhead mount comprises lower mount holes that receive lower dowels and upper mount holes that include upper dowels.

19. The front structural bulkhead of claim 18, wherein the lower dowels comprise lower mounting points that mount rearmost inboard lower control arm joints that couple lower control arms to the front structural bulkhead and fasten the rear portion to the rear bulkhead mount.

20. The front structural bulkhead of claim 18, wherein the upper dowels comprise upper mounting points that fasten the rear portion to the rear bulkhead mount and mount rearmost inboard upper control arm joints that couple upper control arms to the front structural bulkhead.

* * * * *